(12) United States Patent
Muzzo et al.

(10) Patent No.: US 8,007,011 B2
(45) Date of Patent: Aug. 30, 2011

(54) SEALED FLANGE JOINT FOR HIGH PRESSURE AND HIGH PURITY GAS CHANNELS

(75) Inventors: Paul Muzzo, Yutz (FR); Paul Kremer, Helmsange (LU)

(73) Assignee: Luxembourg Patent Company S.A., Luxembourg (LU)

( * ) Notice: Subject to any disclaimer, the term of this patent is extended or adjusted under 35 U.S.C. 154(b) by 136 days.

(21) Appl. No.: 12/279,051

(22) PCT Filed: Feb. 9, 2007

(86) PCT No.: PCT/EP2007/051243
§ 371 (c)(1),
(2), (4) Date: Aug. 11, 2008

(87) PCT Pub. No.: WO2007/090877
PCT Pub. Date: Aug. 16, 2007

(65) Prior Publication Data
US 2009/0085350 A1    Apr. 2, 2009

(30) Foreign Application Priority Data

Feb. 10, 2006 (EP) ..................................... 06101555

(51) Int. Cl.
*F16L 41/00* (2006.01)
(52) U.S. Cl. ............ 285/212; 285/93; 285/336; 285/349
(58) Field of Classification Search .................. 285/363, 285/93, 349, 374, 345, 205, 206, 207, 208, 285/211, 212, 347, 336, 339, 331, 351
See application file for complete search history.

(56) References Cited

U.S. PATENT DOCUMENTS 139,877 A * 6/1873 Dame ........................... 285/328
(Continued)

FOREIGN PATENT DOCUMENTS
DE         4441348       5/1996

OTHER PUBLICATIONS

International Search Report PCT/EP2007/051243; Dated Aug. 1, 2007.

*Primary Examiner* — James M Hewitt
*Assistant Examiner* — Jay R Ripley
(74) *Attorney, Agent, or Firm* — Cantor Colburn LLP

(57) ABSTRACT

A sealed flange joint for high pressure and/or high purity fluid channels includes a first flange with a first fluid channel and a cylindrical front cavity. The front cavity is axially delimited by a ground surface and radially by a peripheral surface. The first fluid channel passes axially through the first flange to open into the ground surface. A polymer seal ring has a radial outer surface and a radial inner surface, and is fitted into the cylindrical front cavity so that its radial outer surface engages the peripheral surface of the front cavity. A second flange is removably fixed onto the first flange, and has a second fluid channel in axial continuation of the first fluid channel. The second flange has an axially protruding cylindrical front nipple with a conical head, the second fluid channel axially opening into an end surface of the conical head. The conical head engages the radial inner surface of the seal ring to radially press the latter with its radial outer surface against the peripheral surface of the front cavity.

9 Claims, 3 Drawing Sheets

U.S. PATENT DOCUMENTS

| | | | | |
|---|---|---|---|---|
| 661,506 A | * | 11/1900 | Fisher | 285/331 |
| 1,181,060 A | * | 4/1916 | Bennett | 277/625 |
| 2,245,154 A | * | 6/1941 | McWane | 277/625 |
| 2,532,891 A | * | 12/1950 | Chupp | 285/97 |
| 2,687,229 A | * | 8/1954 | Laurent | 220/240 |
| 3,141,685 A | * | 7/1964 | Watts | 285/93 |
| 3,854,761 A | | 12/1974 | David | |
| 4,429,905 A | * | 2/1984 | Valentine | 285/93 |
| 4,648,632 A | | 3/1987 | Hagner et al. | |
| 5,226,683 A | * | 7/1993 | Julien et al. | 285/363 |
| 5,330,238 A | * | 7/1994 | Carlstrom | 285/293.1 |
| 5,474,337 A | * | 12/1995 | Nepsund et al. | 285/345 |
| 5,520,419 A | * | 5/1996 | DeBoalt et al. | 285/24 |
| 6,299,216 B1 | * | 10/2001 | Thompson | 285/93 |
| 2003/0080554 A1 | * | 5/2003 | Schroeder et al. | 285/125.1 |
| 2004/0178631 A1 | * | 9/2004 | Frohling et al. | 285/374 |

* cited by examiner

SEALED FLANGE JOINT FOR HIGH PRESSURE AND HIGH PURITY GAS CHANNELS

TECHNICAL FIELD OF THE INVENTION

The invention generally relates to a sealed flange joint for fluid channels, in particular for high pressure and/or high purity gas channels.

BRIEF DISCUSSION OF RELATED ART

The expanded use of specialty gases, and the ever increasing levels of purity demanded by some of today's industries, has created a need for increasingly sophisticated delivery systems of the highest quality and integrity.

In the semiconductor/chip manufacturing industry for example, high quality gas channels are required because any impurities in the gas can adversely affect the electrical properties of the devices and can greatly decrease the manufacturing yield. Most often these gases are also very reactive, corrosive and/or toxic.

Hence, the containment, handling and delivery of ultrapure gases requires specially adapted installations and high quality equipment. In such systems, the quality of the joints and sealing elements is of particular importance, to avoid any leakage of the gas or entry of air into the system. The achievement of a quality seal is even more important and difficult since it should withstand pressures over 200 bars.

Due to these stringent requirements of purity and to the high operating pressures, sealing systems for ultra-high purity systems are often tailor made. In this connection, it is known to use metallic O-rings or flat metallic gaskets at the joint between a delivery pipe and the valve outlet port of a gas cylinder. However, if metallic O-rings withstand high pressures, they leave impressions in the sealing surfaces they are in contact with, which makes them unadapted for use with removable connections.

Unfortunately, there is a strong need for removable connection in high purity applications, since it permits exchanging of equipment and replacement of damaged or deficient parts.

BRIEF SUMMARY OF THE INVENTION

Hence there is a need for a sealing technology that is adapted for high purity, high pressure gas channels, and suitable for removable connections.

A sealed flange joint for fluid channels in accordance with the present invention comprises a first flange with a first fluid channel and a cylindrical front cavity. The front cavity is axially delimited by a ground surface and radially by a peripheral surface. The first fluid channel passes axially through the first flange to open into the ground surface of the front cavity. A polymer seal ring having a radial outer surface and a radial inner surface is fitted into the cylindrical front cavity so that its radial outer surface engages the peripheral surface of the front cavity. The flange joint further comprises a second flange, the first and second flanges being removably fixed to one another. A second fluid channel passes through the second flange in axial continuation of the first fluid channel. The second flange is provided with an axially protruding cylindrical front nipple with a conical head, the second fluid channel axially opening into an end surface of the conical head. It is to be appreciated that the conical head engages the radial inner surface of the polymer seal ring to radially press the latter with its radial outer surface against the peripheral surface of the front cavity.

The present invention thus proposes a joint design where the nipple, pressing against the interior side of the polymer seal ring, causes a strong radial compression of the latter. This is due to the configuration of nipple and polymer seal ring when both flanges are assembled and secured together. The nipple with its conical head transforms the axial pressures into radial compression of the polymer seal ring. The seal ring is thus radially compressed and in fact confined between the nipple and surfaces of the front cavity, which provides a high quality seal that is adapted for high operating pressures, as is often the case in high-purity gas applications.

In addition to the improved sealing function, the present joint proves advantageous in many respects. First, a polymer seal ring will not damage the surfaces it is in contact with, whereby it is much more appropriate for re- and de-connections of the joint than a metallic flat gasket or O-ring. Secondly, the use of a flange joint permits an axial assembly of the joint. The two flanges may be fastened together e.g. by means of screws, so that there is no torsional forces during assembly. This also avoids problems of friction in the sealing region that could produce undesired metallic particles.

Furthermore, the present design permits, during assembly, to initiate (or force) the deformation of the polymer seal ring and put the latter in place in the front cavity. This is mainly achieved by the conical head of the nipple that applies radial forces, which thereby reduces the assembly efforts (in axial direction).

Besides, as the nipple bears (at least with its conical head) against the radial inner surface of the seal ring, it also isolates the latter from the fluid channel, thereby protecting the seal ring from direct contact with the fluid. The impact of this protective configuration of the seal ring will particularly be observed by an improved behaviour during adiabatic chock assays.

A sealed flange joint according to the present invention can advantageously be used for effecting connections between various types of equipment, where a high quality sealing function is required. It may find application in a variety of business areas such as: aerospace, mechanical engineering, stationary hydraulics, chemical industry, process engineering, semiconductor/chip manufacturing, medical engineering. It shall also be noted that the inventive joint may not necessarily comprise two distinct flanges, but one flange can e.g. be integrated in a given portion of equipment (being thus comparable to a mating flange).

The peripheral surface of the front cavity advantageously has a central bulge that engages the radial outer surface of the polymer seal ring. This convex shape of the peripheral surface results in higher compression (higher pressures) at the centre of the seal ring, thereby enhancing the sealing function. In addition, the bulge permits to retain the polymer seal ring in the front cavity during de-connection of the joint.

Upon assembly of the two flanges, the first flange and the nipple delimit a seal ring chamber in the cylindrical front cavity. The seal ring, in a compressed state, preferably has substantially the same cross-sectional shape as the seal ring chamber. Therefore, the cross-section of the seal ring, in the uncompressed state, may be 1.03 to 1.10, preferably 1.03 to 1.07, times greater than the cross-section of the seal ring chamber.

Advantageously, the first flange comprises a first axial abutment surface surrounding the cylindrical front cavity whereas the second flange comprises a second axial abutment surface surrounding the nipple. When the flanges are assembled, the first and second abutment surfaces are axially pressed one against the other. The contacting of the abutment surfaces limits the axial displacement of the flanges towards each other, and thereby avoids crushing of the polymer seal ring. It also protects the sealing region (seal ring, nipple, seal ring chamber) from axial chocks.

In one embodiment, the first flange further comprises a ring shaped groove in the first axial abutment surface, this ring shaped groove surrounding the cylindrical front cavity and being radially delimited by an inner radial surface and an outer radial surface. A second seal ring is arranged in the ring shaped groove, the second seal ring engaging the outer radial surface and being radially spaced from the inner radial surface, so as to radially seal off to the outside an inner ring channel within the ring shaped groove. To allow checking of possible leaks, a connection channel connects the ring channel to a leak-test port in the first flange.

This second seal ring, e.g. an elastomer O-ring, seals off the inner ring channel at the joint between the abutment surfaces, which prevents entry of air and permits to control the sealing quality of the primary seal ring. It also avoids that humidity and other impurities reach the vicinity of the primary, polymer seal ring.

To facilitate the assembly of the flange joints, the first flange may comprise an axially protruding positioning head forming the first axial abutment surface. The second flange may then comprise a positioning cavity forming the second axial abutment surface, this positioning cavity being designed to receive and radially position the axially protruding positioning head. Not only does this design help with the positioning of the two flanges, but the positioning head/cavity configuration permits to bear radial efforts at the joint.

Another advantage of the positioning cavity is that it protects the nipple when the first flange is not assembled to the second flange. The nipple may therefore have a height that is smaller or equal to the depth of the positioning cavity. If desired, the cavity—and thus the nipple—can be covered by a removable cover.

In some embodiments, the height of the nipple may be such that a small gap separates the end surface of the conical head of the nipple from the ground surface of the front cavity when the first and second abutment surfaces have been axially pressed one against the other. In such case, the polymer seal ring is preferably designed such that, in the compressed state, it radially penetrates into this small gap to fill it up. This avoids any "dead volume" at the periphery of the fluid channels, where particles, condensation or gases/fluids could accumulate.

Regarding more precisely the primary, polymer seal ring, it shall preferably be made from a thermoplastic polymer that has low permeability to gases and that exhibits low creeping under load (i.e. at high pressures). The selected polymer should of course not be loaded with hard particles (e.g. glass or the like) to avoid damaging the sealing surfaces. A preferred polymer meeting these criteria is PolyChloroTriFluoroEthylene (PCTFE), which can be used for operating temperatures in the range of −60° C. to 100° C. Other materials that can be used for the primary seal ring are polyimides or PFA.

To avoid assembly and matching mistakes, the present flange joint may comprise a pin indexing system, as is known in the art.

According to another aspect of the present invention, a seal ring for a sealed flange joint as defined above has a radial inner surface and a radial outer surface. The radial outer surface includes a central hollowed cylindrical surface; and the radial inner surface includes a central frusto-conical surface.

In a preferred embodiment, the radial inner surface further includes a first cylindrical surface towards the end where the diameter of the central frusto-conical surface is the largest; and a second cylindrical surface towards the end where the diameter of the central frusto-conical surface is the smallest. Preferably, in the uncompressed state, the width of the seal ring in the region of the first cylindrical surface is about 1.4 to 2.2 times the width of the seal ring in the region of said second cylindrical surface.

The seal ring may have flat annular upper and lower surfaces. Chamfered corners may join the flat annular upper an lower surfaces to the central hollowed cylindrical surface.

BRIEF DESCRIPTION OF THE DRAWINGS

The present invention will now be described, by way of example, with reference to the accompanying drawings, in which.

DETAILED DESCRIPTION OF THE INVENTION

A preferred embodiment of a sealed flange joint in accordance with the present invention is illustrated in the Figures. The present sealed flange joint involves the assembly of a pair of flanges in a sealed manner, as will be seen below. Such flange joint design can be used for a variety of sealed connections in fluid, especially gas, channels and any fluid/gas containment, handling or dispensing systems, e.g. between a gas cylinder valve port and a delivery pipe. The present type of flange joint is particularly suited for applications using ultra pure, very corrosive and high pressure gases.

Figure 3:
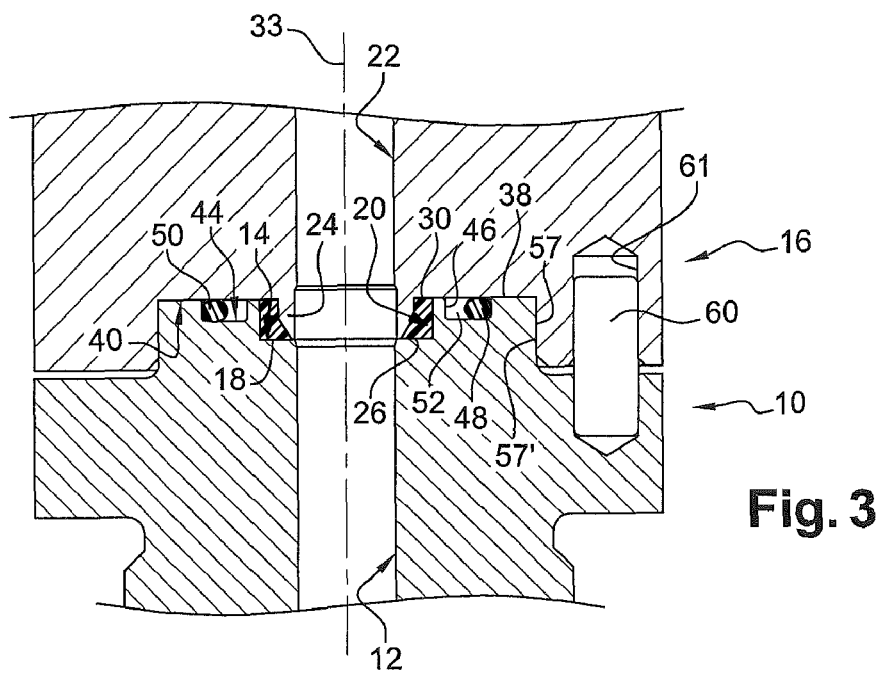
FIG. 3: is a section view along line B-B in FIG. 1.

Turning now to FIG. 3, there is shown a first flange 10 having a first gas channel 12 and a cylindrical front cavity 14. This first flange 10 may e.g. be provided at the extremity of a delivery pipe 15. Reference sign 16 generally indicates a second flange, the two flanges 10 and 16 being removably fixed to one another, as will be explained further below. Such second flange structure may e.g. be provided at the dispensing port of a gas cylinder valve. As can be seen, the second flange 16 is integrated in the valve port and is not built as a distinct flange, whereby it may also be seen as a mating flange.

The front cavity 14 of the first flange 10 is axially delimited by a ground surface 18 and radially by a peripheral surface 20. The first gas channel 12 passes axially through the first flange 10 to open into the ground surface 18 of the front cavity 14.

Figure 5:
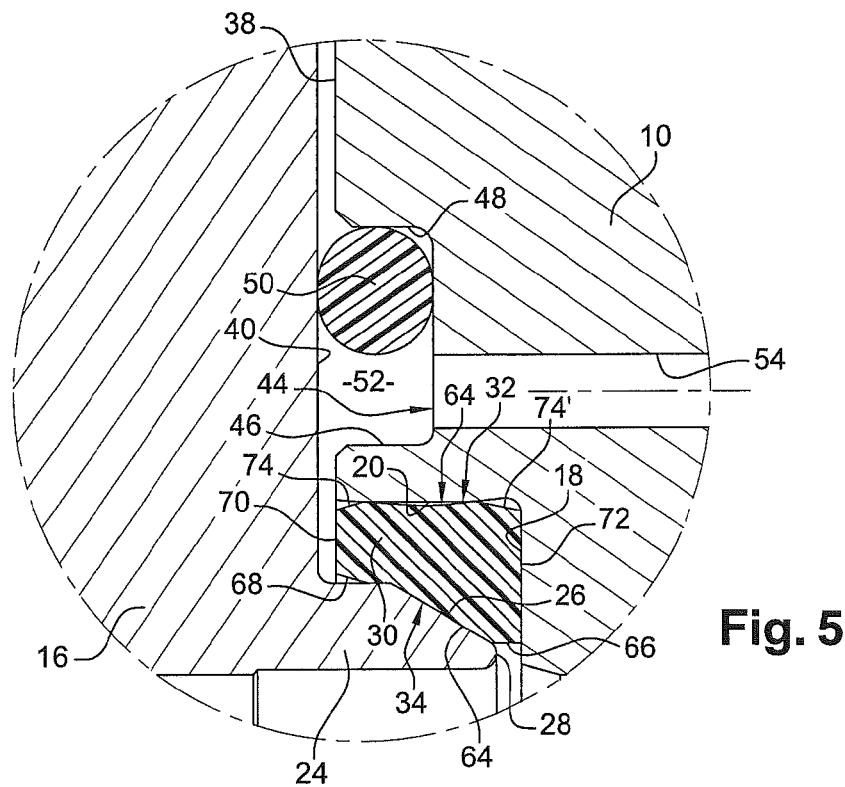
FIGS. 5 and 6: are detail views of area D in FIG. 4, respectively showing the polymer seal ring in the uncompressed and compressed state.

The second flange 16 has a second gas channel 22 passing through the second flange 16 in axial continuation of the first gas channel 12. The second flange 16 further comprises an axially protruding cylindrical front nipple 24 with a conical head 26. The second gas channel 22 axially opens into an end surface 28 at the tip of this conical head 26 (FIG. 5).

It is to be noted that a polymer seal ring 30, having a radial outer surface 32 and a radial inner surface 34, is fitted into the cylindrical front cavity 14 so that its radial outer surface 32 engages the peripheral surface 20 of the front cavity 14.

Furthermore, the conical head 26 of the second flange 16 engages the radial inner surface 34 of the polymer seal ring 30 to radially press the latter with its radial outer surface 32 against the peripheral surface 20 of the front cavity 14.

Figure 1:
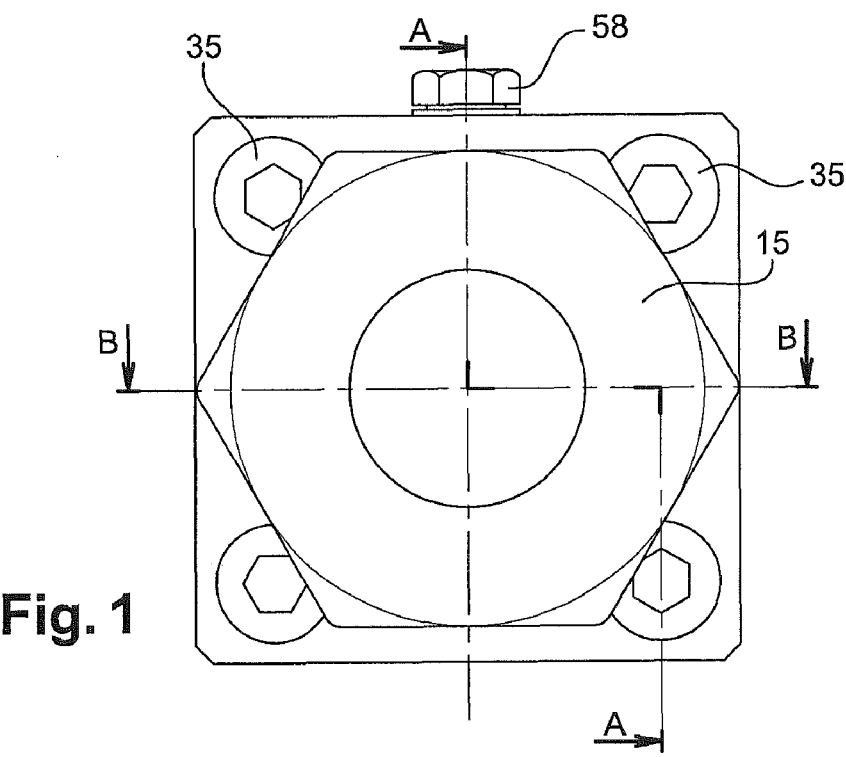
FIG. 1: is a front view of a preferred embodiment of a flange joint according to the invention, as seen from the outer side of the first flange.
Figure 4:
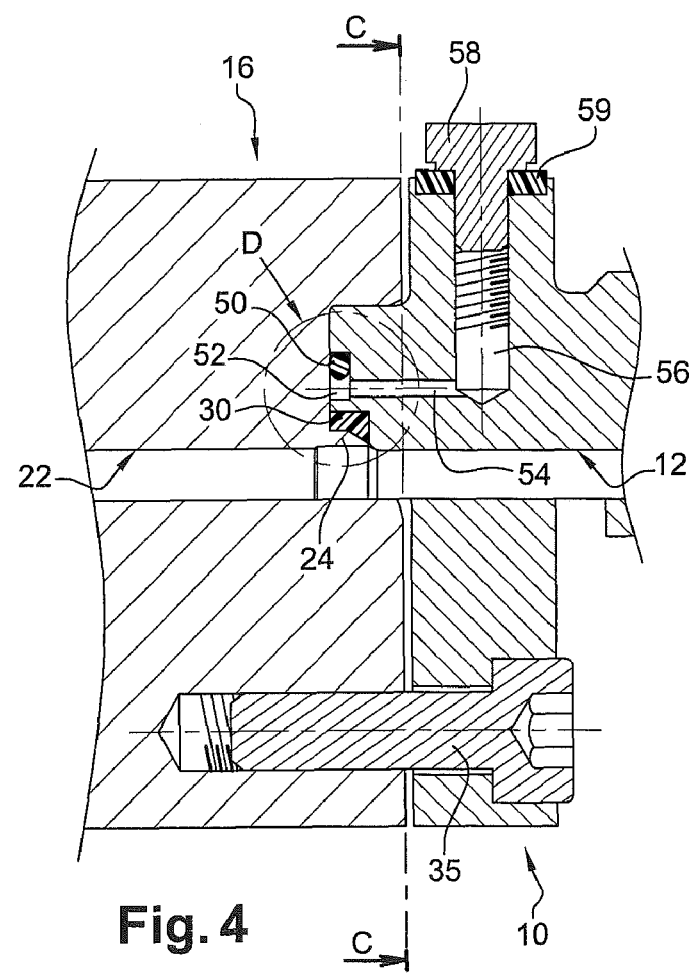
FIG. 4: is a section view along line A-A in FIG. 1.

As can be understood from the Figures, the assembly of the flanges 10 and 16 is done by axially (axis 33) pressing them together. The flanges are preferably fastened together by means of screws 35 that maintain the flanges into contact with each other. In the present embodiment, the four screws 35 are inserted from the exposed side of the first flange (FIG. 1), and the threaded portions of the screws engage corresponding threaded bores in the second flange 16 (see FIG. 4).

As the flanges 10 and 16 are assembled, the nipple 24 is positioned in the front cavity 14. The nipple 24 with its conical head 26 transforms the axial pressures into radial compression of the seal ring 30. The seal ring 30 is thus radially compressed and confined between the nipple 24 and the peripheral surface 20 of the front cavity 14, which provides a high quality seal that is adapted for high operating fluid or gas pressures.

Figure 6:
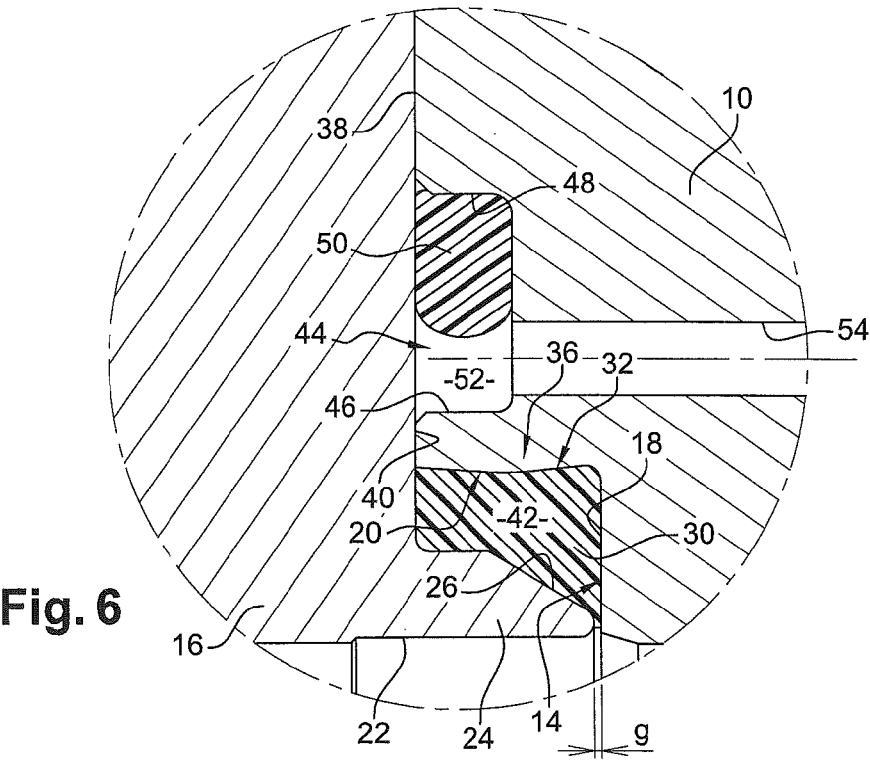

As can be better seen in FIGS. 5 and 6, the peripheral surface 20 of the front cavity 14 preferably has a central bulge 36 that engages the radial outer surface 32 of the polymer seal ring 30. This convex shape of the peripheral surface 20 results in higher compression (higher pressures) at the centre of the seal ring 30, thereby enhancing the joint sealing. The bulge 36 also permits to retain the seal ring 30 in the front cavity 14 when the flanges 10 and 16 are separated from each other.

In the present embodiment, the first flange 10 advantageously comprises a first axial abutment surface 38 surrounding the cylindrical front cavity 14 and the second flange 16 comprises a second axial abutment surface 40 surrounding the nipple 24. These abutments surfaces 38 and 40 are designed to come into abutment when the flanges 10 and 16 are assembled, and bear the axial pressure forces resulting from the fastening of the flanges. In practice, these abutment surfaces 38 and 40 prevent an excessive compression of the seal ring 30 during assembly and more generally provide a protection of the seal function against axial chocks. As a further protection of the sealing function and of the joint, the screws 35 bear and prevent any torsional forces applied to the joint.

As can be observed in the Figures, the first flange 10 and the nipple 24 delimit a seal ring chamber 42 (indicated in FIG. 6 only) in the cylindrical front cavity 14. In the assembled state (i.e. the abutment surfaces are in contact with each other), which also implies a compressed state of the polymer seal ring 30, the latter preferably has substantially the same cross-section (as shown in FIG. 6) as the seal ring chamber 42 (FIG. 6), which is thus completely filled by the seal ring 30.

In this connection, it can be further noted that upon assembly (when the first and second abutment surfaces have been axially pressed one against the other), there remains a small gap g that separates the end surface 28 of the conical head 24 of the nipple from the ground surface 18 of the front cavity 14. In the present embodiment, the seal ring 30 radially penetrates into the small gap g to fill it up. Since the seal ring chamber 42 and even the small gap g between nipple tip 28 and the ground surface 18 are filled up by the seal ring 30, there is no dead volume in this region where gas/fluid, condensate or particles could accumulate.

This particular configuration of the polymer seal ring 30 completely filling up the chamber 42 and the gap g can be better observed in FIG. 6. By contrast, in FIG. 5 where the assembly is not complete (abutment surfaces not in contact), one can observe that the seal ring 30 does not fill up the gap g separating the nipple tip 28 from the ground surface 18.

The present embodiment provides a particularly effective sealing function surrounding the gas/fluid channels 12 and 22 at the interface between the two flanges 10 and 16. As it clearly appears from FIG. 6, the seal ring 30 is confined in the seal ring chamber 42 between the nipple 24 and the walls (18, 20) of the front cavity 14. The tight contact between the abutments surfaces 38 and 40 closes the seal ring chamber 42, thereby avoiding any creeping of the seal ring at (through) this junction. The only opening in the seal ring chamber 42 is the very narrow gap g. Hence, only a very small portion of the seal ring 30 is directly exposed to the gas pressure in the channel. Due to this configuration, in particular where the seal ring chamber 42 is closed by the abutment surfaces 38 and 40, there is no way that the seal ring 30 can be dislodged by the high pressure gas flowing in the gas channels 12 and 22.

In connection with the above-described structure it may be noted that the seal-ring 30 is preferably designed such that in the assembled state, it fills up the chamber 42 as well as the gap g, however without protruding in the gas channels 12, 22. As can be seen in FIG. 6, the seal ring 30 in the gap g is flush with the surface of channel 12 in the first flange 10.

In summary, the proposed configuration featuring the nipple 24 with conical head 26 permits to exert a radial compression of the seal ring 30 when the flanges 10 and 16 are assembled. This permits to initiate the deformation of the seal ring in radial direction that leads to the putting into place of the seal ring 30 in the seal ring chamber 42, while reducing the assembly efforts in axial direction since the seal ring 30 solicitation is mainly radial. In the final assembly configuration (as shown in FIG. 6), the seal ring 30 is confined in the seal ring chamber 42 and compressed therein over essentially its whole periphery (except at gap g), which ensures a high sealing quality.

In the present embodiment, the first flange 10 comprises a ring shaped groove 44 in the first axial abutment surface 38. This ring shaped groove 44 surrounds the cylindrical front cavity 14 and is radially delimited by an inner radial surface 46 and an outer radial surface 48. A second seal ring 50, preferably made from elastomer material, is arranged in the ring shaped groove 44. The second seal ring 50 engages the outer radial surface 48 and is radially spaced from the inner radial surface 46, so as to radially seal off to the outside an inner ring channel 52 within said ring shaped groove 44. A connection channel 54 connects the ring channel 52 to a leak-test port 56 in the first flange 10. The leak-test port may be closed by a plug 58.

The second seal ring 50 seals off the inner ring channel 52 at the joint between the abutment surfaces, which prevents entry of air and permits to control the sealing quality of the primary seal ring 30 though the connection channel 54 and port 56. It also avoids humidity (and impurities) to reach the vicinity of the primary seal ring 30.

Also to ensure sealing against atmospheric air and humidity, the plug 58 is preferably a screw (e.g. M4 screw) that is screwed on a corresponding threading in port 56. Reference sign 59 indicates a seal ring, e.g. a PTFE seal ring, arranged below the head of screw 58.

The assembly of the two flanges 10 and 16 is facilitated by the design of the present embodiment. In FIG. 3, one will recognise that the first flange 10 comprises an axially protruding positioning head forming the first axial abutment surface 38. The second flange 16 in turn comprises a positioning cavity forming the second axial abutment surface 40, whereby the positioning cavity is designed to receive and radially position the axially protruding positioning head. This configuration ensures a proper positioning of the different elements of the main sealing function. In addition, the axially extending mating surfaces 57 and 57' of head and cavity respectively will bear radial chocks and thereby protect the sealing function.

The nipple 24 preferably has a height that is smaller or equal to the depth of the positioning cavity. The nipple is thus protected by the surrounding cavity when the first flange 10 is not connected to the second flange. Furthermore, the inside of the cavity can be protected by a cover (not shown).

Figure 2:
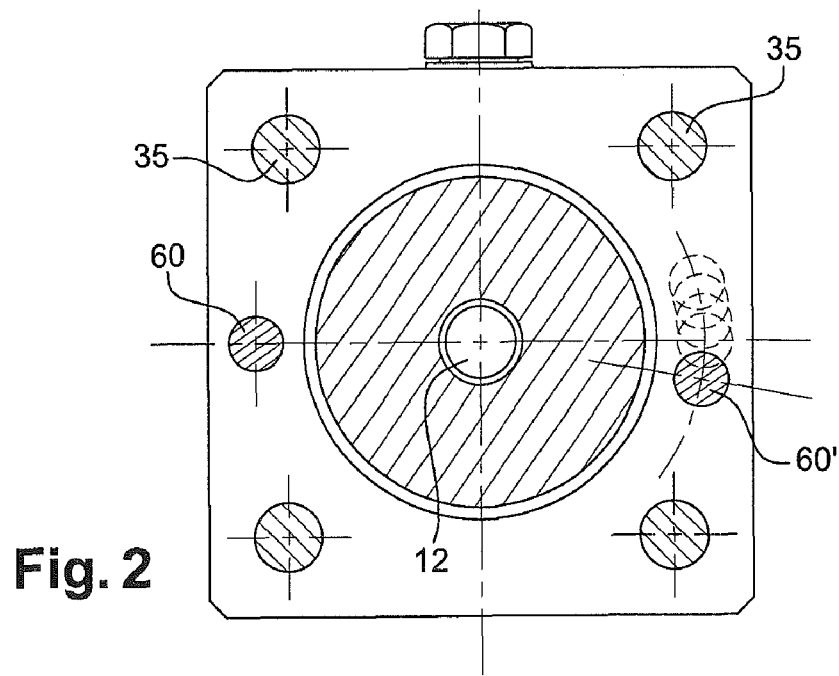
FIG. 2: is a section view along line C-C in FIG. 3.

As is conventional in the art, the present joint may comprise a pin indexing system. This is illustrated in FIG. 2, where reference sign 60 indicates a first indexing pin and reference sign 60' a second indexing pin, although one pin may is sufficient to achieve a coding function. Pin 60 is fixed (screwed) to the first flange 10 and engages into a corresponding hole 61 in the second flange 16. The indexing pin(s) (extending in axial direction) not only serve coding purposes, but also bear rotational efforts on the joint.

In the present embodiment, the polymer sealing ring 30 has, in the uncompressed state, a particular shape that is adapted to the shape of seal ring chamber 42. Generally, the cross-section (as shown in FIGS. 5 and 6) of the seal ring 30 before use (before compression) may be 3 to 10% greater than in the compressed state.

As can be seen in FIG. 5, the radial outer surface 32 includes a central hollowed cylindrical surface 62. The radial inner surface 34 includes a central frusto-conical surface 64; a first cylindrical surface 66 towards the end where the diameter of the central frusto-conical surface 64 is the largest; and a second cylindrical surface 68 towards the end where the diameter of the central frusto-conical surface is the smallest. In the uncompressed state, the width of the seal ring 30 in the region of the first cylindrical surface 66 is about 1.4 to 2.2 times the width of the seal ring 30 in the region of the second cylindrical surface 68. More critical about the design of the first cylindrical surface 66 is that, in the compressed state, it should preferably not protrude into the gas channels, as already previously mentioned.

Furthermore, when seen in the axial direction 33, the seal ring 30 has flat annular upper 70 and lower 72 surfaces. Chamfered corners 74, 74' join the flat annular upper an lower surfaces 70, 72 to the central hollowed cylindrical surface 64.

All these design features of the seal ring 30 surface and of the seal ring chamber 42 contribute to an improved matching of shapes leading to a complete, tight filling of the chamber 42 by the polymer seal ring 30, which is maintained under constant pressure at its periphery (except at the gap g) by the chamber 42 walls due to compression (volume reduction).

In summary, in the present sealed flange joint the seal ring 30 is in fact compressed essentially over its whole periphery (except at the gap g) by confinement in the seal ring chamber 42. During assembly of the flanges 10, 16, the seal ring 30 is initially radially pushed and compressed by the conical head 26 of the nipple 24. Upon assembly, the seal ring 30 is enclosed in seal ring chamber 42 (the cross-section of which is smaller than that of the uncompressed seal ring 30), whereby the walls of the seal ring chamber exert a pressure on nearly the whole periphery of the seal ring. This results in a peripheral pressure on the seal ring, providing a high sealing quality. Furthermore, the increased radial compression of the seal ring 30 between nipple 24 and bulge 36 further enhances the sealing quality. Creating radial compression forces through the nipple conical head 26 reduces the required assembly force in the axial direction.

In other words, the present design permits to reduce assembly forces and provides a geometry that puts the seal ring 30 into place and forces the seal ring to be confined in, and conform to, the seal ring chamber 42, in which it is peripherally compressed, except at the gap g (the design of which has been explained above). Hence, nearly the whole peripheral surface of the seal ring 30 participates to the sealing. This design is quite different from conventional sealing designs where e.g. an O-ring is compressed (typically in the axial assembly direction) at two opposite peripheral portions.

It remains to be noted that in the present embodiment, especially at high pressures, the polymer material should preferably have low permeability to gases and low creeping. Such materials are typically not elastomers, but more rigid polymers having less elasticity, so that the seal ring will typically undergo plastic deformation during assembly.

Such suitable material for polymer seal ring 30 is for example PolyChloroTriFluoroEthylene (PCTFE). This material has low permeability to gases and low creeping under load. It also allows operation of the valve between −60° C. to 100° C.

However, for applications with less stringent sealing requirement, e.g. at lower pressures and especially with liquids, one an elastomer ring may be employed.

As for the secondary sealing function, the O-ring 50 may be made from elastomer polymer, e.g. NBR (Nitrile Butadiene Rubber) or Viton® (a fluoroelastomer by DuPont).

As already mentioned, the present joint design can be adapted to provide a removable, sealed connection between a variety of gas/fluid devices. A particular application is in the field of high purity gas cylinders, which conventionally include a valve with a specific coupling for connection to a gas line, etc. The coupling of such valve, integrated in the bulk of the valve body, is very fragile and is often damaged by mechanical chocks. This requires the replacement of the entire valve on the gas cylinder, and thus implies heavy maintenance and cleaning procedures of the gas cylinder due to the high purity application.

The present flange joint provides a sealing solution that avoids such problems of maintenance and cleaning in case of damage at the coupling. For example, the valve opening of the gas cylinder valve can be designed as the second flange 16. One end of a sleeve member is then provided with the first flange 10 design, while its opposite end is designed to provide the specific coupling structure. This sleeve member is mounted with the first flange end onto the valve opening having the second flange design, whereby the gas cylinder valve is provided with the desired specific coupling. In case the specific coupling is damaged, it suffices to replace the sleeve member by a new one, which can easily and effectively be done thanks to the present joint design. It is no longer necessary to replace the whole gas cylinder valve, thereby also avoiding the heavy maintenance and cleaning procedures.

It is considered that the ruggedness of the present flange design allows at least 50 re- and de-connections without compromising the quality of the sealing (the seal rings may of course be replaced before re-connection).

The invention claimed is:
1. A sealed flange joint for fluid channels comprising:
a first flange with a first fluid channel and a cylindrical front cavity, said front cavity being axially delimited by a ground surface and radially by a peripheral surface, said first fluid channel axially passing through said first flange to open into said ground surface of said front cavity;
a polymer seal ring having a radial outer surface and a radial inner surface, said seal ring being fitted into said cylindrical front cavity so that its radial outer surface engages said peripheral surface of said front cavity; and a second flange with a second fluid channel passing through said second flange in axial continuation of said first fluid channel, and an axially protruding cylindrical front nipple with a conical head, said second fluid channel axially opening into an end surface of said conical head, wherein said first and second flange are removably fixed to each other;

wherein said first flange and said nipple delimit a seal ring chamber in said cylindrical front cavity; said seal ring, in a compressed state, having substantially the same cross-sectional shape as said seal ring chamber;

wherein said conical head engages and delimits said radial inner surface of said polymer seal ring to radially press the latter with its radial outer surface against said peripheral surface of said front cavity; and wherein said first flange comprises an axially protruding positioning head forming a first axial abutment surface surrounding said cylindrical front cavity, said second flange comprises a positioning cavity forming a second axial abutment surface that surrounds said nipple such that said nipple is arranged therein, said first and second abutment surfaces being axially pressed one against the other, said positioning cavity being configured to receive and radially position said axially protruding positioning head;

wherein a small gap separates said end surface of said conical head of said nipple from said ground surface of said front cavity when said first and second abutment surfaces have been axially pressed one against the other; and wherein said nipple has a height that is smaller or equal to the depth of said positioning cavity.

2. The sealed flange joint as claimed in claim 1, wherein said peripheral surface of said front cavity has a central bulge engaging said radial outer surface of said polymer seal ring.

3. The sealed flange joint as claimed in claim 1, wherein, in an uncompressed state, the cross-section of said seal ring is 1.03 to 1.10 times greater than the cross-section of said seal ring chamber.

4. The sealed flange joint as claimed in claim 3, wherein, in an uncompressed state, the cross-section of said seal ring is 1.03 to 1.07 times greater than the cross-section of said seal ring chamber.

5. The sealed flange joint as claimed in claim 1, wherein, in the compressed state, said seal ring radially penetrates into said small gap to fill it up.

6. The sealed flange joint as claimed in claim 1, wherein said first flange further comprises:

a ring shaped groove in said first axial abutment surface, said ring shaped groove surrounding said cylindrical front cavity and being radially delimited by an inner radial surface and an outer radial surface;

a second seal ring in said ring shaped groove, said second seal ring engaging said outer radial surface and being radially spaced from said inner radial surface, so as to radially seal off to the outside an inner ring channel within said ring shaped groove; and a connection channel connecting said inner ring channel to a leak-test port in said first flange.

7. The sealed flange joint as claimed in claim 1, wherein first flange and said second flange are axially pressed together by means of screws.

8. The sealed flange joint as claimed in claim 1, further comprising a pin indexing system.

9. The sealed flange joint as claimed in claim 1, wherein said fluid channels are high pressure and/or high purity gas channels.

* * * * *